(12) United States Patent
Triola

(10) Patent No.: US 8,204,807 B2
(45) Date of Patent: *Jun. 19, 2012

(54) SYSTEMS, APPARATUS, AND METHOD RE ESCROW DATA AND DOCUMENTATION

(75) Inventor: C. Richard Triola, Laguna Beach, CA (US)

(73) Assignee: Settleware Secure Services, Inc., Laguna Beach, CA (US)

( * ) Notice: Subject to any disclaimer, the term of this patent is extended or adjusted under 35 U.S.C. 154(b) by 993 days.

This patent is subject to a terminal disclaimer.

(21) Appl. No.: 11/437,985

(22) Filed: May 18, 2006

(65) Prior Publication Data
US 2007/0078762 A1    Apr. 5, 2007

Related U.S. Application Data

(63) Continuation of application No. 09/833,390, filed on Apr. 11, 2001, now Pat. No. 7,127,406.

(60) Provisional application No. 60/198,785, filed on Apr. 20, 2000.

(51) Int. Cl.
  *G06Q 40/00* (2012.01)
(52) U.S. Cl. ........................................................ 705/35
(58) Field of Classification Search .................. None
  See application file for complete search history.

(56) References Cited

U.S. PATENT DOCUMENTS

| | | | |
|---|---|---|---|
| 4,876,648 A | 10/1989 | Lloyd | |
| 5,260,024 A | 11/1993 | Aspden et al. | |
| 5,615,268 A | 3/1997 | Bisbee et al. | |
| 5,644,726 A | 7/1997 | Oppenheimer | |
| 5,745,706 A | 4/1998 | Wolfberg et al. | |
| 5,794,207 A * | 8/1998 | Walker et al. | 705/1 |
| 5,875,435 A | 2/1999 | Brown | |
| 5,924,082 A | 7/1999 | Silverman et al. | |
| 5,930,776 A | 7/1999 | Dykstra et al. | |
| 5,940,811 A | 8/1999 | Norris | |
| 5,966,699 A | 10/1999 | Zandi | |
| 5,983,206 A | 11/1999 | Oppenheimer | |
| 5,991,745 A | 11/1999 | Kiritz | |
| 5,995,947 A | 11/1999 | Fraser et al. | |
| 6,012,047 A | 1/2000 | Mazonas et al. | |
| 6,016,482 A | 1/2000 | Molinari et al. | |
| 6,029,149 A | 2/2000 | Dykstra et al. | |

(Continued)

OTHER PUBLICATIONS

Inman, B., ("Speeding up a closing with help help on the 'net'", The Fresno Bee, Fresno, Calif.: Mar. 31, 1996, p. F1).*

(Continued)

Primary Examiner — Olabode Akintola
(74) Attorney, Agent, or Firm — Ladas & Parry LLP

(57) ABSTRACT

The apparatus and method implements, manages, and tracks on-line digital transactions via an escrow, including opening, servicing, real-time or near-real time status of the broker, title company, lender, vendor, buyer and seller, and closing of an escrow via a medium such as the internet. Multiple access methods are employed. The present invention provides computerization and internet type process implementation for escrow processes including, but not limited to, digital transaction coordination, digital status coordinators, seamless escrow transactions, on-line digital signatures, video signature authentication, digital certificate authentication, signature authentication, satellite and other wireless transmission of escrow transactions, voice digital instruction, the merging of voice with digital data transactions, set-top/WebTV digital escrow transmission, global digital escrow networking, and the like. The system includes appropriate data, application, and servers along with supporting LAN or WAN-based application to perform escrow services.

48 Claims, 6 Drawing Sheets

U.S. PATENT DOCUMENTS

| | | | |
|---|---|---|---|
| 6,223,169 B1 | 4/2001 | Mori et al. | |
| 6,304,860 B1 | 10/2001 | Martin, Jr. et al. | |
| 6,343,273 B1 | 1/2002 | Nahan et al. | |
| 6,343,738 B1 | 2/2002 | Ogilvie | |
| 6,594,633 B1 * | 7/2003 | Broerman | 705/313 |
| 2002/0023036 A1 | 2/2002 | Meder | |
| 2002/0046144 A1 | 4/2002 | Graff | |
| 2002/0049624 A1 | 4/2002 | Raveis, Jr. | |

OTHER PUBLICATIONS

Inman, B., ("Speeding up a closing with help help on the 'net'", The Fresno Bee, Fresno, Calif.: Mar. 31, 1996, p. F1.*

PCT Notification of Transmittal of the International Search Report or the Declaration, Aug. 22, 2001, 5 pages.

PCT/US01/13021, Written Opinion and Search Report, May 1, 2002, Geoffrey Akers, Vincent Millin, James R. Matthews.

* cited by examiner

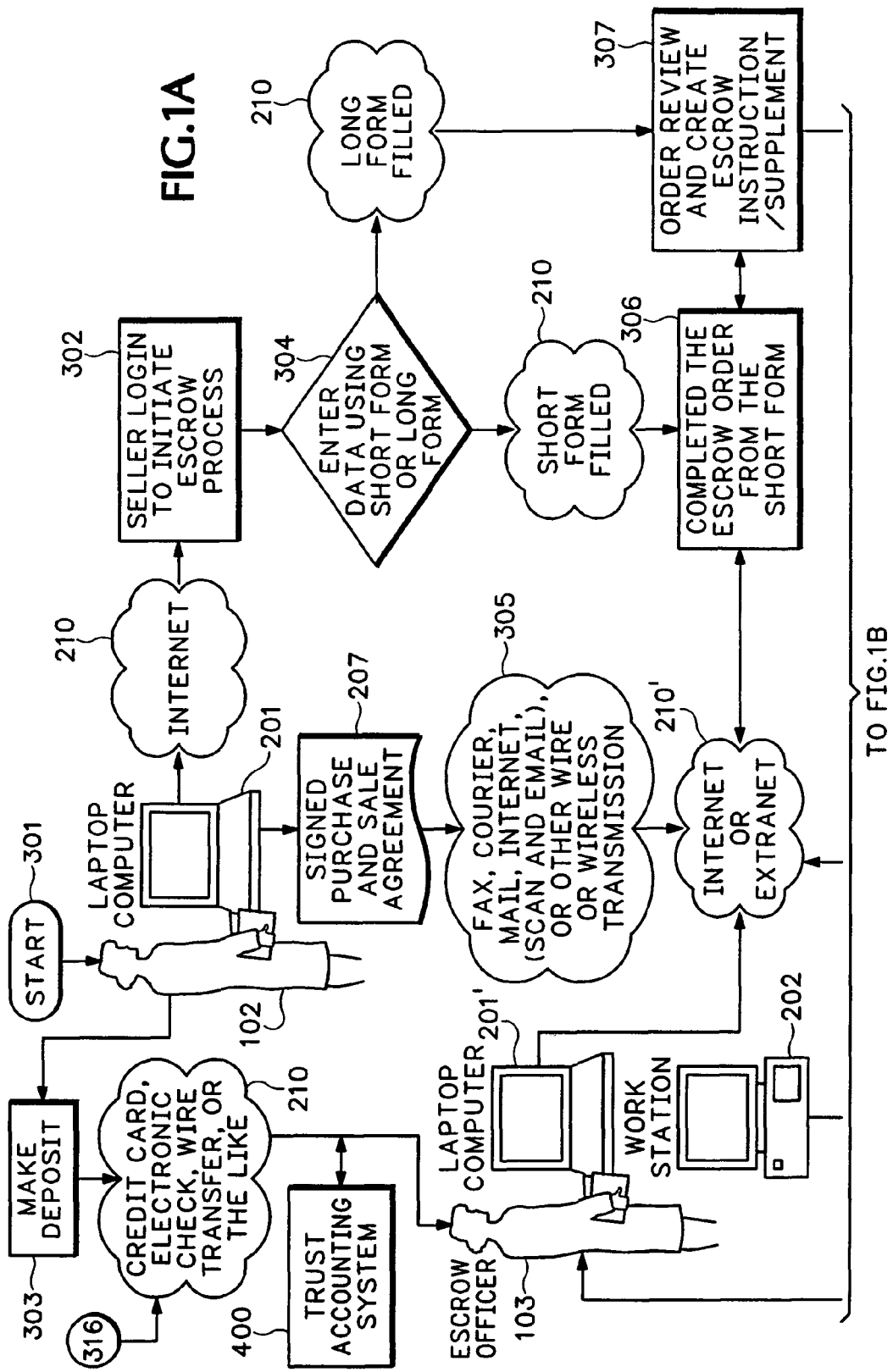

FIG. 3

Eezcrow.com

Escrow Instructions Form

Use Tab key to move cursor, NOT the Return/Enter key.

Seller(s)
Name: _____
Address: _____
Phone#: _____

Buyer(s)
Name: _____
Address: _____
Phone#: _____

Property Address: _____
Purchase Price: _____
Loan Amount: _____
Down Payment: _____
Term of Escrow: _____
Contingencies: _____

- About Eezcrow
- ePersona Signature
- Laws & Regulations
- Find a Vendor
- Confidentiality & Insurance
- Contact Us
- Home Open New Escrow Account Check Escrow Status Now

215'

SYSTEMS, APPARATUS, AND METHOD RE ESCROW DATA AND DOCUMENTATION

CROSS-REFERENCE TO RELATED APPLICATIONS

This is a Continuation of U.S. patent application Ser. No. 09/833,390, filed Apr. 11, 2001, now U.S. Pat. No. 7,127,406 claiming priority from U.S. Provisional Application No. 60/198,785, filed Apr. 20, 2000.

STATEMENT REGARDING FEDERALLY SPONSORED RESEARCH OR DEVELOPMENT

None.

REFERENCE TO AN APPENDIX

None.

BACKGROUND OF THE INVENTION

1. Field of the Invention

The present invention relates generally to computer programs and, more specifically to a method and apparatus for processing escrow transactions and a method of doing business in escrow transactions using computers and computer network technology. More particularly, the present invention relates to a computerized method and apparatus for escrow transactions and a method of doing business in escrow transaction management, preferably using the Internet.

2. Description of the Related Art

Glossary

The following terms and definitions are provided for the convenience of the reader; no limitation on the scope of the invention is intended by this GLOSSARY nor should any be implied therefrom.

"Client-Server": A model of interaction in a distributed computer network system in which a program at one site sends a request to another site and then waits for a response. The requesting program is called the "client," and the program which responds to the request is called the "server." In the context of the World Wide Web ("www" or "web" defined hereinafter), the client is a "browser;" i.e., a program which runs on a computer of an end-user. A program and network computer which responds to a browser request by serving web pages and the like, is referred to as a "server." Specialized servers, such as dedicated electronic mail (defined hereinafter) servers are also known in the art.

"Electronic Mail" ("e-mail"): The process and software for sending and receiving of textual information and attachments thereto between end-users over a distributed computer network such as the internet; internet access providers often include e-mail service to its customers as part of the access software that allows the end user to dial into the internet.

"Internet": A generic term for a collection of distributed, interconnected networks (ARPANET, DARPANET, World Wide Web, or the like) that are linked together by a set of industry standard protocols (e.g., TCP/IP, HTTP, UDP (defined hereinafter), and the like) to form a global, distributed network.

"Hypertext Mark-up Language" ("HTML"): A standard coding convention and set of codes for attaching presentation and linking attributes to informational content within documents; the primary standard used for generating web documents. During a document authoring stage, the HTML codes (referred to as "tags") are embedded within the informational content of the document; when the document is subsequently transferred from a server to a client, the codes are interpreted by the browser and used to parse and display the document. In specifying how the browser is to display the document, HTML tags can be used to create hyperlinks to other web documents.

"HyperText Transport Protocol" ("HTTP"): The standard Internet (infra) client-server protocol used for the exchange of information such as HTML documents and client requests for such documents between a browser and the server. HTTP—or HML or the like—includes a number of different types of messages which can be sent from the client to the server to request different types of server actions. For example, a "get" message which has the format GET<URL> (defined hereinafter) causes the server to return the document or file located at the specified URL.

"Internet": A generic term for a collection of distributed, interconnected networks (ARPANET, DARPANET, World Wide Web, or the like) that are linked together by a set of industry standard protocols (e.g., TCP/IP, HTTP, UDP (defined hereinafter), and the like) to form a global, distributed network.

"Web Site": A computer system that serves informational content over a network using standard protocols of the web. Typically, a web site corresponds to a particular internet domain name, such as WIDGET.COM", and includes the content associated with a particular organization such as Widget Company. The term is generally intended to encompass both (1) the hardware/software server components that serve the informational content over the network, and (2) the "back-end" hardware-software components, including any non-standard or specialized components that interact with the server component to perform service for web site users.

"World Wide Web" (WWW or simply "web"): Refers generally to both (1) a distributed collection of interlinked, user-viewable hypertext documents ("web documents" or "web pages") that are accessible via the internet, and (2) the client and server software components which provide user access to such documents using standardized internet protocols. Currently, the primary standard protocol for allowing applications to locate and acquire web documents is HTTP, and the web pages are encoded using HTML. However, the terms "web" and WWW or "world wide web" as used herein are intended to encompass future mark-up languages and transport protocols which may be used.

BACKGROUND OF THE INVENTION

In the main, an escrow is a third party to a transaction between a seller and a buyer (the buyer and seller are collectively referred to as the "principals"). A deed, a bond, money, a piece of property, or other valuable, is delivered to the third party—hereinafter referred to as the "escrow officer"—to be delivered by the officer to the grantee only upon the fulfillment of all the conditions precedent which are imposed upon the principals and are usually of the express terms and conditions of a purchase and sale agreement (also referred to more simply as the "sales contract" hereinafter). In essence, the property is placed in trust in an escrow account.

Escrow transactions can be for both personal and real property. Some states (e.g. California) provide for the use of licensed escrow agents when a sale of real estate is being transacted. For the purpose of describing the present invention, an exemplary escrow transaction for real estate is considered; no limitation on the scope of the invention is intended by the inventor nor should any be implied therefrom.

While computers are important tools for the buyers and sellers of a valuable property jointly referred to as the "principals"), in the main, the use of actual purchase agreements, escrow services and associated contracts, such as loan agreements, are handled manually since the true identity of the principals and their agreement by signature on the assorted contracts and documents involved is a critical, personal factor. Notarization on the more important documents is often required. The coordination of the various entities involved with the transfer of a real estate property—namely the principals, agents, real estate brokers, attorneys, lending institutions such as banks or other mortgage related institutions, insurance companies, government and quasi-governmental entities (such as county clerk offices, local real estate boards, state deed recording and tax departments, and the like), vendors (e.g., title companies, property inspectors, property assessors, home owners associations, and the like), and any and all other entities involved in the transaction to be escrowed, is assigned to a licensed escrow agent. In turn, the escrow agent usually must involve the aid of administrative assistants to track all of the required paperwork and transfer of funds necessary to complete the transaction. As can be imagined, the number of such real estate transactions in a single California county on a daily basis is enormous. Moreover, commercial realty transactions involve even more complex service involving even more service providers.

With the advent of the so-called computer age, lending institution have devised methods and apparatus for processing mortgages and other loans. Mortgages and other transactions involving banks and credit-loan associations have been the subject of computerization for many years. See, e.g., U.S. Pat. No.:

U.S. Pat. No. 4,876,648, SYSTEM AND METHOD FOR IMPLEMENTING AND ADMINISTERING A MORTGAGE PLAN;
U.S. Pat. No. 5,924,084, NEGOTIATED MATCHING SYSTEM;
U.S. Pat. No. 5,930,776, LENDER DIRECT CREDIT EVALUATION AND LOAN PROCESSING SYSTEM;
U.S. Pat. No. 5,940,811, CLOSED LOOP FINANCIAL TRANSACTION METHOD AND APPARATUS;
U.S. Pat. No. 5,983,206, COMPUTER SYSTEM AND COMPUTER-IMPLEMENTED PROCESS FOR IMPLEMENTING A MORTGAGE PARTNERSHIP;
U.S. Pat. No. 5,966,699, SYSTEM AND METHOD FOR CONDUCTING LOAN AUCTION OVER COMPUTER NETWORK;
U.S. Pat. No. 5,991,745, REVERSE MORTGAGE LOAN CALCULATION SYSTEM AND PROCESS;
U.S. Pat. No. 5,995,947, INTERACTIVE MORTGAGE AND LOAN INFORMATION AND REAL-TIME TRADING SYSTEM;
U.S. Pat. No. 6,012,047, REVERSE MORTGAGE PROCESSING SYSTEM;
U.S. Pat. No. 6,016,482, ENHANCED COLLATERALIZED FUNDING PROCESSOR; and
U.S. Pat. No. 6,029,149, LENDER DIRECT CREDIT EVALUATION AND LOAN PROCESSING SYSTEM.

Buyers are often "pre-qualified" by a lending institution for a particular loan amount even before seeking the right property. As a result, one of the problems of the marketplace is that the cause of delays experienced in valuable property exchange escrow transactions have shifted from the lending institution to the escrow agent. In some states, e.g., California, real estate transactions are regularly conducted via an escrow.

With the establishment of the internet, the world wide web, and the like, the emergence of e-commerce has generated a need for a computerized method and apparatus for processing escrow transactions and a method of managing escrows using such tools.

BRIEF SUMMARY OF THE INVENTION

The present invention provides a method and apparatus for independent third party transaction facilitation, providing on-line digital escrow services.

The present invention provides a software system for offering secure escrow accounts for the acquisition of real and personal property and for business-to-business transactions using such vehicles as the internet, world wide web, wireless telecommunications and the like.

The present invention provides a method and apparatus for digital escrow transactions.

The present invention provides an internet (or the like) based automation system that provides for implementing, managing, and tracking escrow transactions which will be accessible for specific parties to a particular transaction.

The present invention includes security measures for digital escrow transactions.

The present invention provides for a web browser (or the like) for opening of escrow for both real and personal property via on-line entry of escrow instructions, and further including remote printing of escrow documents for party signatures or some other method of electronic signature, ordering all of escrow related services to appropriate service providers, accepting status updates for service providers and/or seller and/or buyer, viewing item status and activity associated with each escrow performance item, tracking of all fund transfers through all processes, and final closing of escrow.

The present invention provides a method and apparatus for safe and secure harbor of escrowing real and personal property and business-to-business transactions over vehicles such as the internet and wireless communications.

The present invention provides a method and apparatus for computerized digital escrow transactions including broker status, lender status, buyer & seller status, and the transaction servers coupled using multiple access such as internet, intranet, extranet, via all connectivity types which include but are not limited to wireless, satellite, dial-up, or leased communications.

The present invention provides a system for real-time or near-real-time escrow transactions including appropriate data, application, and web servers along with supporting network based applications to perform at least one of the following for authorized parties to an escrow:

receive/store escrow instructions upon submission by a party to the escrow (or their agent) via a computerized communications device;

disseminating instructions to all relevant parties by electronic means, fax, or physical delivery, including preference determination;

providing escrow documentation electronically;

providing escrow documentation approval;

automating order specified services through electronic means;

real-time and near-real-time display of escrow instructions, status, and activity;

providing for electronic personal identification authentication; and closing escrow;

release of escrow funds;

digital transfer of escrow funds.

In its basic aspect, the present invention provides an apparatus for escrow transactions, including: a computer based automation system, having components providing implementation, management, and tracking of escrow transactions, wherein data for implementing, managing, and tracking the escrow transactions is accessible for specific parties to said escrow transactions.

In another aspect, the present invention provides a client-server computer system for escrow of property, including: at least one client module associated with at least one client party for initiating an escrow process with at least one escrow party; and as at least one server module associate with the escrow party, wherein a specific escrow account between said client party and said escrow party is established, maintained, tracked, and consummated via said client-server computer system.

In still another aspect, the present invention provides a computerized method for escrow such as the escrowing of property and business-to-business transactions, the method including: providing a computer based automation system of components, including components providing implementation, management, and tracking of the escrow wherein data for implementing, managing, and tracking the escrow transactions is accessible for specific parties to said escrow.

In yet another aspect, the present invention provides a process for a computerized escrow transaction including: providing escrow account, escrow status, broker status, lender status, buyer status, seller status, and vendor status via a centralized server associated with an escrow officer, and connecting parties to said computerized escrow transaction using multiple computer network access devices via connectivity types which include but are not limited to wireless, satellite, dial-up, or leased communications.

In another aspect, the present invention provides a system for real-time or near-real-time escrow transactions, including: appropriate data, application, and transactional management programs; and supporting network based applications to perform at least one of the escrow services selected from a group including: receiving and storing escrow instructions upon submission by a party to the escrow transaction via a computerized communications device; disseminating instructions to all relevant parties by computer; providing escrow documentation; providing escrow documentation approvals; automating order specified services; real-time and near-real-time display of escrow instructions, status, and activity; on-line digital identification authentication; transfer of ownership; closing escrow; releasing of escrow funds; and digital transfer of escrow funds.

In a further aspect, the present invention provides a method of doing business using an internet including: providing an on-line escrow account for parties to a transaction; providing on-line transactional account management services with respect to the on-line escrow account for said parties; and providing secure access to said on-line escrow account limited to the parties and third parties using on-line identification authentication.

In another aspect, the present invention provides a computer memory including: program code providing a client-server based automation system for an escrow transaction; program code providing implementation, management, tracking, and closing of specific escrow transactions; and program code allowing escrow transaction data access only for specific parties to said escrow transaction.

The foregoing summary is not intended to be an inclusive list of all the aspects, objects, advantages, and features of the present invention nor should any limitation on the scope of the invention be implied therefrom. This Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches. Objectives, features and advantages of the present invention will become apparent upon consideration of the following explanation and the accompanying drawings, in which like reference designations represent like features throughout the drawings.

BRIEF DESCRIPTION OF THE DRAWINGS

FIG. 1 extends across three sheets marked FIG. 1A, FIG. 1B and FIG. 1C, to be understood to comprise FIG. 1 in references thereto hereinafter.

FIG. 3 is an exemplary computer screen display illustrating an exemplary, computerized Escrow Form in accordance with the present invention as shown in FIG. 1.

The drawings referred to in this specification should be understood as not being drawn to scale except if specifically annotated.

DETAILED DESCRIPTION OF THE INVENTION

The system and method of operation of the present invention includes the use computerized devices and telecommunications devices connected to the Internet (or the like) which is adapted to perform:
receiving instructions for the opening of an escrow;
providing and sending digital instructions to all parties involved in the transaction;
is offering the availability of a continuous digital escrow transaction by coordinating and permitting access to the on-going status of an escrow in progress;
on-line digital signature, voice, video fingerprint or retina scanning personal identification authentication;
transfer of funds or other consideration;
submission of loan documents;
closing escrow, delivering clear title, and release of transaction funds;
and the like as would be useful in an escrow transaction.

The apparatus and method implements, manages, and tracks on-line digital transactions via an escrow, including opening, servicing, real-time or near-real time status of the broker, title company, lender, vendor, buyer and seller, and closing of an escrow via a medium such as the internet. Multiple access methods are employed. The present invention provides digital computerization and internet type process implementation for escrows including, but not limited to:
escrow transaction coordination,
escrow vendor service transaction coordination escrow status coordination and communication,
seamless escrow transactions,
party and third party personal identification authentication, such as on-line digital signature, thumb-print, retinal scan, video signature authentication, digital certificate authentication, and the like (generically referred to hereinafter as identification authentication; no limitation on the scope of the invention is intended by this list nor should any be implied), transmission of digital escrow instructions, and voice digital instructions, the merging of voice with escrow transactions, wireless escrow transactions, set-top/WebTV escrow transactions, global digital escrow networking, including appropriate data, application, and servers along with supporting LAN or WAN-based application to perform escrow services, and the like. In other words, the present invention proposes a completely computerized and networked system for any type of escrow transaction.

Reference is made now in detail to a specific embodiment of the present invention which illustrates the best mode presently contemplated by the inventor for practicing the invention. Alternative embodiments are also briefly described as applicable.

Figure 1B:
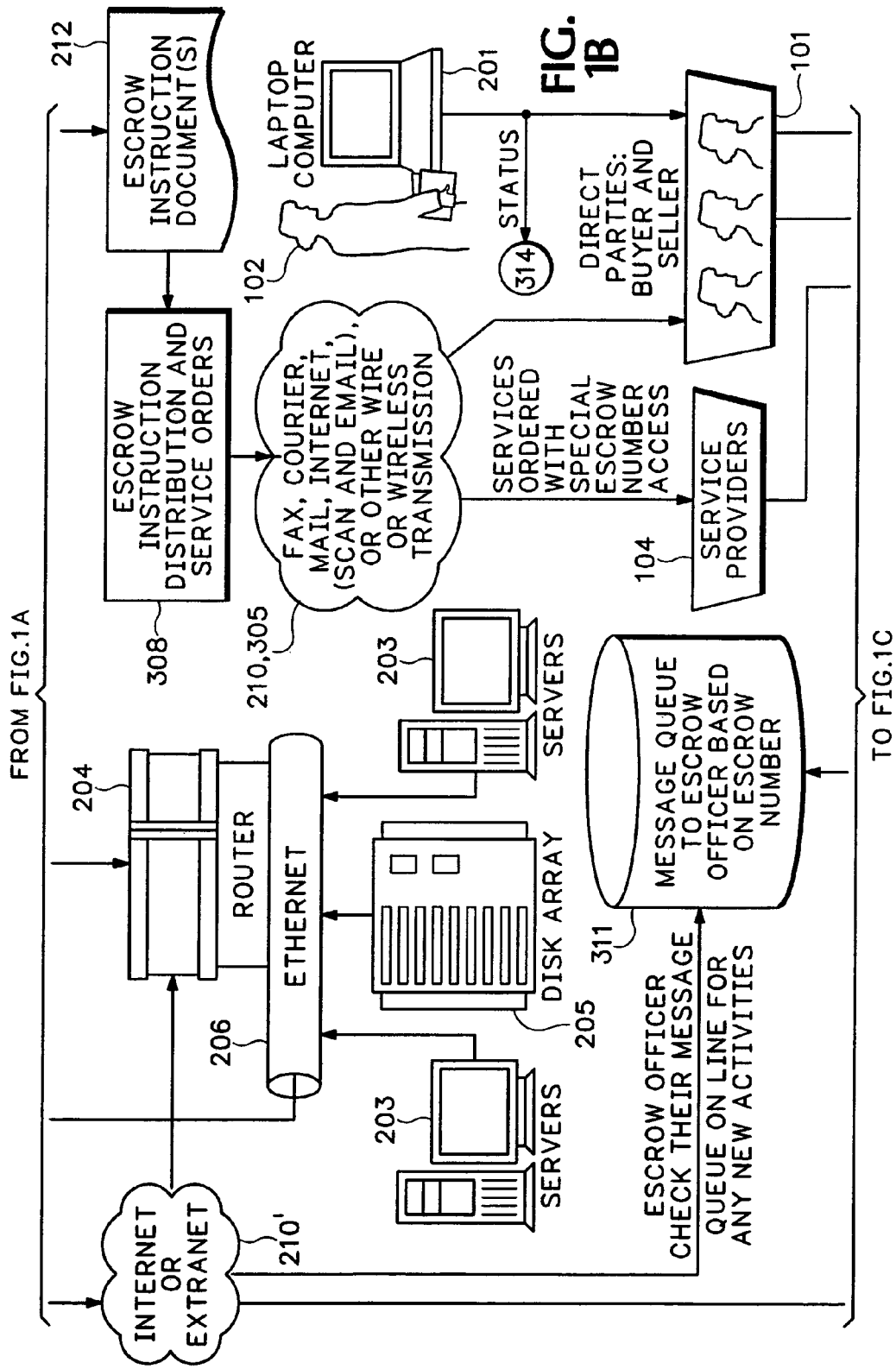
FIG. 1 is an illustration of the present invention.
Figure 1C:
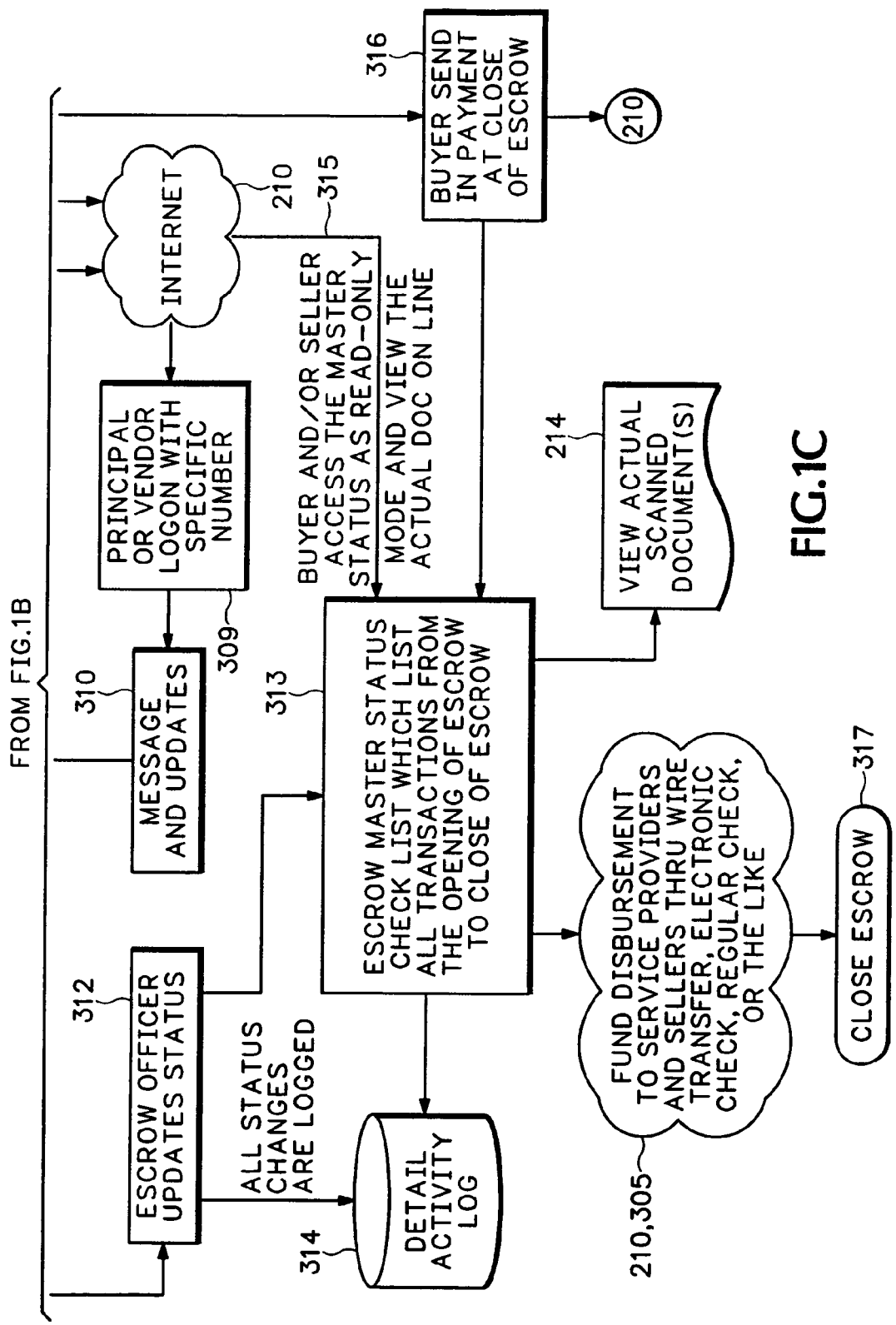

Turning to FIG. 1, standard, commercially available, computing and network serving apparatus employed in accordance with the present invention are schematically illustrated and labeled for identification: laptop computers 201—or personal digital assistants, wireless internet ready devices, or the like—workstation computers 202, (all such computer microprocessor-based type devices used by or useful to individuals in accordance with the present invention are collectively and generically referred to hereinafter as simply "computers;" no limitation on the scope of the invention is intended nor should any be implied), network routers 204, memory apparatus 205, networking equipment 206, and programs for operating; labeled cloud-balloons are used to depict the Internet or localized extranet 210' services as known in the art. Provision can be made for foreign language use and interpretation. Digital handwriting recognition software can be employed.

The bulk of the equipment 202, 204, 205, 206 is located with an escrow officer 103 or escrow company employing the officer. In the main, a client-server relationship is provided between an escrow officer or company as the server and the other parties as the client. Note also that the functions related to the escrow company may be automated As an example transaction to describe the present invention, a real estate purchase and sale and escrow transaction will be used. This example is only used to simplify the detailed description of the present invention; no limitation on the scope of the invention is intended nor should any be implied.

Let it be assumed that the principals 101 and their respective real estate agent(s) 102 have consummated an offer and acceptance for a specific piece of property—step 301, "START." Further assume that the principals 101 and realty agent 102 have access to computers and associated printers, faxes, and the like, including appropriate Internet browser programs.

Figure 2:
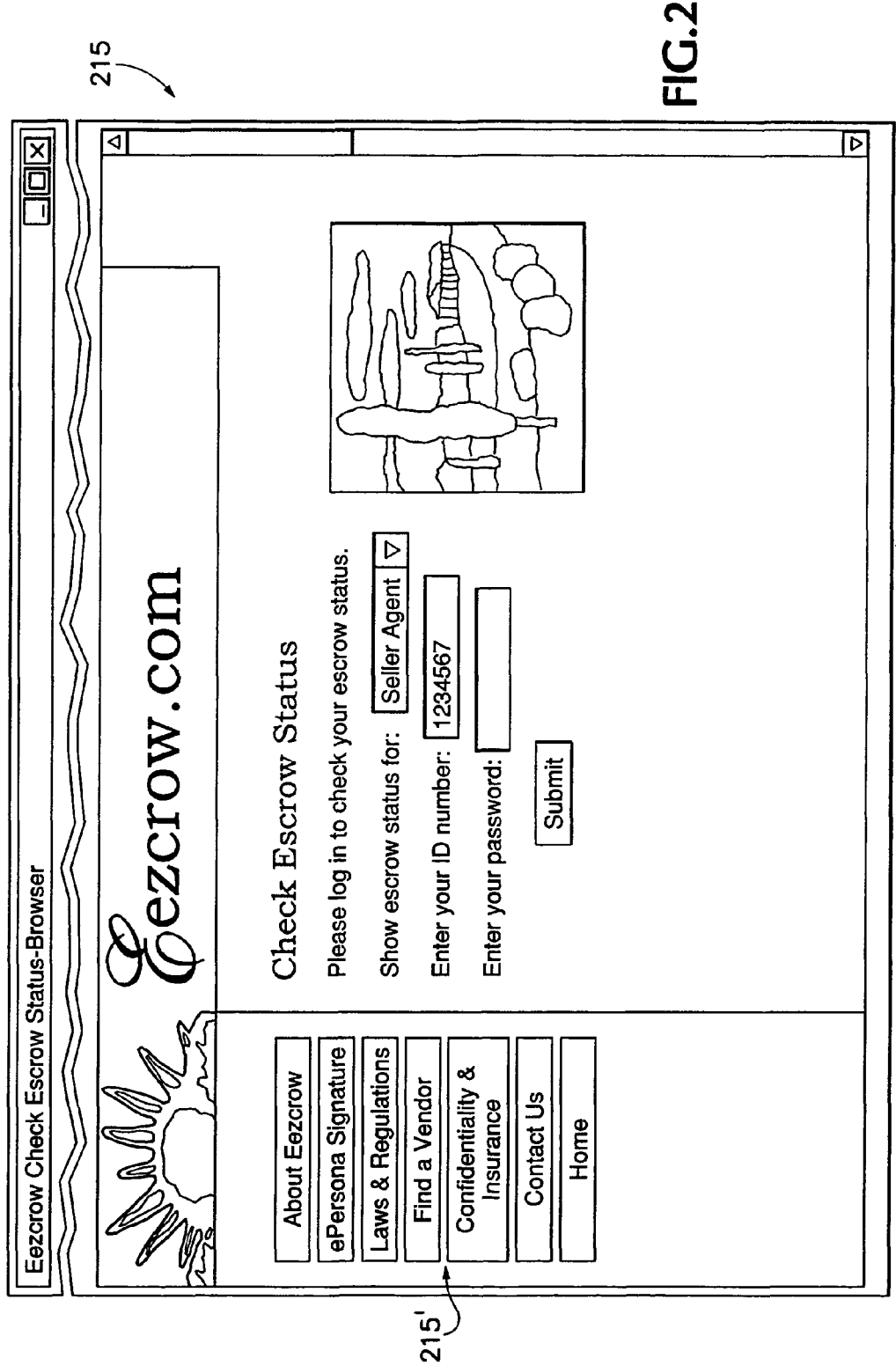
FIG. 2 is an exemplary computer screen display illustrating an exemplary, computerized Log In screen in accordance with the present invention as shown in FIG. 1.

A purchase agreement 207 has been signed by the principals 101. It is therefore been agreed to open an escrow account to handle the complex details of the transaction with a particular escrow agent, or "officer," 103. A principal's agent 102, having appropriate components of a program in accordance with the present invention—referred to hereinafter as EEZCROW™ program (EEZCROW is a trademark of EEZCROW Company of Laguna Beach, Calif.) loaded on a computer 201, using the internet 210, logs into the EEZCROW program—step 302, "Seller Login to Initiate Escrow Process"—connecting to the computer 201' or 202 of the escrow officer 103 representing the licensed escrow company involved. FIG. 2 is an exemplary computer screen 215 associated with a Log-In procedure in accordance with the present invention. Note that virtual buttons Personal identification authentication is an important part of the escrow process. Using one or more state of the art digital identification authentication technologies, the principals 101 and agent 102 and officer 103 are each provided with unique identities so that the escrow process will be completely secure and confidential. Other involved entities may be added as needed, e.g., lending institutions that may wish to transfer funds electronically.

Two transactions take place. First, a deposit in accordance with the signed purchase agreement 207 is transferred via the internet 210 to the escrow officer 103—step 303, "Deposit." A trust accounting system 400 is incorporated into the process. Fund data, such as credit card information, electronic checking, wire transfer, or the like, is procured from the seller 101. Second, the agent 102 provides the information that the escrow officer 103 will need to accomplish the various escrow tasks and obligations—referred to generically hereinafter as the "escrow order." The agent 102 uses forms provided as part of the EEZCROW program module, or other compatible electronic forms, on their computer 201—step 304, "Enter data using Short Form or Long Form." The form is then transmitted to the escrow officer via the Internet 210, the escrow officer having appropriate modules of the EEZCROW program on their computer(s) 201', 202. Note that this initial document, in Short Form or Long Form, basically resides in memory accessible by the escrow officer 103, such as the disk array 205. This memory is accessible by the escrow officer 103 through either an Internet or Extranet connection 210' from either a laptop 201' or office workstation 202. It should be recognized by those skilled in the art that appropriate security modules are used in accordance with the present invention for verification of all parties described and yet to be described, digital signature approval, documents and funds access, and the like. Additionally, the realty agent 102 may use their computer to transmit a copy of the signed purchase agreement 207 to the escrow officer 103—step 305.

FIG. 3 is an exemplary, computerized Escrow Instructions Form as might appear on the computer 201 screen; see step 304. Again, having the appropriate modules of the EEZCROW program, the realty agent 102 provides the applicable data by filling in the blanks and the Form is transmitted back to the escrow officer 103. Moreover, any and all official documents associated with opening an escrow account is captured electronically (if not digitally available, scanned or the like) and transmitted with the Escrow Instructions Form.

It is now incumbent upon the escrow officer 103 to either complete the Escrow Instructions Form as an escrow order—step 306—or to review the order—step 307, and to create therefrom a specific, identifiable (e.g., by case number or other designator), and their escrow instructions document 212, spelling out the duties, rights, and obligations of the principals 101, the realty agent 101, and the escrow officer 103. The escrow officer 103—preferably via Internet, but if certain parties do not have access, via other distribution channels—then distributes the appropriate escrow instructions and orders any services that the escrow officer 103 is obligated to perform or have performed by service providers 104—step 308, "Escrow Instruction Distribution and Service Orders." In this process step, the escrow instruction documents distributed electronically are distributed with case identification and specific log-in instructions, including party identification and security password, for on-line access and personal digital identification authentications and signatures.

Any EEZCROW modules that principals may need to participate via the Internet are transmitted with the escrow instructions to that particular principal or reside at the workstation 202 where the principal can access forms or the like remotely from there own terminal. Note that the case file is thus available for party access to status check or update specific information for which they have a specific security key to access. For example, a lending institution may have a security key to access that section of the case file concerning a mortgage application and grant or denial status.

Each of the parties—the principals 101, realty agent(s) 102, and service providers/vendors 104—has access to the escrow account file residing on the escrow officer 104 company computer memory 205 via the Internet 210. The escrow account file is analogous to a web site. At any time, these parties 101, 102, 104 can log—step 309 and, using the specific escrow account number and their security key, can provide updates or other messages to the escrow officer 103—step 310. The escrow officer 104 is kept apprised of all activity, preferably via electronic mail messages—step 311—stored in main memory 205 or an auxiliary memory (schematically represented by the barrel shaped icon in FIG. 1). Note that in order to ensure proper escrow processing, it may be provided that all updates 310 are actually funneled through the escrow office 103 for entering into the escrow account file—step 312.

Figure 4:
FIG. 4 is an exemplary computer screen display illustrating an exemplary, computerized escrow status internet page in accordance with the present invention as shown in FIG. 1.

It is generally the escrow officer's 103 duty to maintain the escrow Master Status record—step 313. This includes the review and verification, or questioning of, important documents—e.g., grant deeds, certificates of ownership, title insurance policies loan documents and applications, homeowners association documents, zoning disclosure reports, home warranty policies, pest and other property inspection reports, natural hazard disclosures, geological reports, lead-based paint inspections, escrow settlement statements, government and quasi-government forms (e.g. CAL-FIRPTA, RESPA, Megan's Law, and the like), and the like documents 214—which are necessary, or advisable, to completing the escrow. The escrow officer 103 will keep a detailed escrow activity log as part of the escrow account file—step 314. Note that as the principals 101 have individual and somewhat conflicting agendas in completing the transaction, the principals access to the Master Status record 313 is preferably kept to a "read only" mode, path 315. In other words, while a buyer or seller might provide update information 310 to the escrow officer 103 for appropriate action or inaction, they have no security key to access the actual Master Status record 313. FIG. 4 is an exemplary computer screen display 401 demonstrating an escrow account status in accordance with the present invention.

Once all conditions of the escrow have been met, the buyer sends in the necessary funds to close escrow—step 316. The escrow officer 102 then completes all the necessary requirements—such as recording deeds, transfer of title (including title insurance), distribution of payments, and the like—necessary or important documents to close the escrow—step 317.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . ."

What is claimed is:

1. An apparatus including a processor and a memory coupled to the processor for an escrow transaction of real or personal property, the apparatus comprising:
    system components associated with a computer based automation system, said system components causing the processor to provide escrow processes via online communications, comprising:
        (1) receiving electronically signed documents related to the opening of an escrow, (2) sending digital instructions to at least one party involved in the transaction related to the opening of the escrow, (3) implementing identity authentication and electronic or digital signatures for documents requiring signature by at least one of the parties, and (4) providing for a variety of levels of security for access to documents,
        managing, by verifying said documents,
        digitally tracking and coordinating and permitting access to an ongoing status of the escrow transaction, and
        closing of said escrow transaction for real or personal property, including at least one of electronically transferring, registering, and recording of said documents, and receiving or sending online confirmation of a close of the escrow transaction and of delivery of final loan agreements, and releasing transaction funds.

2. The apparatus as set forth in claim 1, comprising:
    said components including computer program modules distributed among parties to said escrow transaction, said parties including at least one of principals, agents, service providers, governmental entities, quasi-governmental entities, and vendors, and
    said computer program modules providing associated data entry and access to said documents.

3. A system for real estate escrow transaction data and electronic document processing and transmitting over an Internet, comprising:
    at least one first unit coupled to the Internet, said first unit associated with at least one escrow or real estate office and having a first computer program code unit for implementing real estate escrow transactions, a second computer program code unit for managing the real estate escrow transactions, and a third computer program code unit for closing said real estate escrow transactions,
        wherein the implementing of the escrow includes electronically or digitally signing or receiving of any electronically or digitally executed escrow-related contracts, agreements, or instructions,
        wherein the managing of the escrow includes verifying said escrow-related contracts, agreements, or instructions, or transferring of funds or other compensation, and wherein the closing of the escrow includes receiving or sending online confirmation of a close of escrow, delivery of final loan agreements, or releasing transaction funds;

at least one second unit coupled to the Internet, said second unit associated with at least one of the buy-sell principals and agents thereof and having a second computer program code unit for coupling to said first computer program code unit; and at least one third unit coupled to the Internet, said third unit associated with at least one service provider, vendor, governmental entity, or quasi-governmental entity and having a third computer program code unit for coupling to said first computer program code unit and said second computer program code unit, wherein the escrow-related contracts, agreements, or instructions are accessible via the Internet by said first unit and said second unit and said third unit, and wherein starting escrow is triggered by parties electronically or digitally executing the escrow-related contracts, agreements, or instructions to open the escrow.

4. The system as set forth in claim 3, comprising:

first computer program modules distributed among said first unit, said second unit, and said third unit, said first computer program modules providing predetermined associated data entry and access for at least one of principals, agents, service providers, vendors, governmental entities, and quasi-governmental entities.

5. The system as set forth in claim 4, comprising:

each of said first computer program code unit and said second computer program code unit and said third computer program code unit having second computer program modules including means for providing for a variety of levels of security for access to said escrow-related contracts, agreements, or instructions.

6. A method implemented on a computer having a processor and a memory coupled to the processor, to perform operations to enable an escrow process for real or personal property using on-line communications systems, the method comprising:

establishing using the processor an on-line escrow account for any party;

controlling on-line transactional account management services for said any party with respect to the on-line escrow account, said services including providing any data and documents associated with implementing the on-line escrow account via the on-line communications systems, wherein said implementing includes at least one of (1) receiving or sending at least one escrow document to be signed electronically or digitally related to an escrow, (2) sending digital instructions to a first party involved in the transaction related to the escrow to electronically or digitally sign at least one escrow document, (3) implementing identity authentication on the at least one escrow document to be electronically or digitally signed, (4) electronically or digitally signing the at least one escrow document, and (5) providing for a variety of levels of security for access to at least one escrow document that is to be electronically or digitally signed, and managing by receiving online the at least one electronically or digitally signed document, and closing by verifying online that the electronically or digitally signed at least one escrow document has been signed, submitting the at least one electronically or digitally signed document to a second party involved in the escrow process, and receiving or sending online confirmation of a close of escrow including that the at least one escrow document has been electronically or digitally signed.

7. The method as set forth in claim 6, comprising:

said services including party identification and security access measures for each of said parties, including on-line access using digital party identification authentications for access to data and documents associated with said account and for digital signatures or electronic signatures of said documents.

8. An apparatus including a processor and a memory coupled to the processor for performing operations to enable an escrow process for personal or real property, comprising:

associated with a telecommunications system, system components for causing said processor to provide escrow processes including at least one of (1) sending documents or instructions for said escrow transaction to third party agents or principals for electronic or digital signature or that have been electronically or digitally signed, and (2) receiving documents or instructions for said escrow transaction from third party agents or principals for electronic or digital signature or that have been electronically or digitally signed, and perform managing and closing, wherein the managing includes receiving online the at least one electronically or digitally signed document, wherein the closing is by verifying online that the at least one electronically or digitally signed document has been signed, submitting the at least one electronically or digitally signed document to a party involved in the escrow process, receiving or sending online confirmation of a close of escrow and of delivery of final loan documents, and releasing transaction funds.

9. An apparatus including a processor and a memory coupled to the processor to perform operations to enable an escrow process for personal or real property, comprising:

associated with a telecommunications system, system components for causing said processor to provide processes relating to an escrow transaction, said escrow processes including at least one of (1) sending any escrow-related document, contract, agreement, or instruction to a party or principal to be electronically or digitally signed, (2) enabling a party or principal to electronically or digitally sign any escrow-related document, contract, agreement, or instruction, and (3) receiving any electronically or digitally signed escrow-related document, contract, agreement, or instruction, and perform managing and closing, wherein the managing includes receiving online the at least one electronically or digitally signed document, wherein the closing is by verifying online that the at least one electronically/digitally signed document has been signed, submitting the at least one electronically/digitally signed document to a party involved in the escrow process, receiving or sending online confirmation of a close of escrow and of delivery of final loan documents, and releasing transaction funds, and wherein said system components include at least one digital computerization and internet type process implementation program module for authenticating an electronic or digital signature and/or identity of a principal or party.

10. A computer program product, stored on a non-transitory computer readable medium, comprising instructions that, when executed on one or more computers, cause the one or more computers to perform operations to enable an escrow process for personal or real property, the operations comprising:

via online communications at least one of (1) receiving or sending at least one escrow document to be signed electronically or digitally related to the escrow process, (2) sending digital instructions to a first party involved in the escrow process to electronically or digitally sign at least one escrow document, (3) implementing identity authentication on at least one escrow document to be electronically or digitally signed, (4) electronically or digitally signing at least one escrow document, and (5) providing for a variety of levels of security for access to at least one escrow document that is to be electronically or digitally signed;

tracking online a status of the electronically or digitally signed at least one escrow document;

managing by receiving online the electronically or digitally signed at least one escrow document; and closing by at least one of verifying online that the electronically or digitally signed at least one escrow document has been signed, submitting the electronically or digitally signed at least one escrow document to a second party involved in the escrow process, and receiving or sending online confirmation of a close of the escrow process including that the at least one escrow document has been electronically or digitally signed.

11. The computer program product of claim 10, wherein online communications comprise one of a dial-up, leased, satellite, and wireless network.

12. The computer program product of claim 10, wherein the first or second party comprises one of a principal, agent, real estate agent or broker, mortgage agent or broker, notary, service provider, title or abstract company or representative, closing or settlement agent, secondary investor, loan servicer, attorney, banker, lending institution, insurance company, government entity, quasi-governmental entity, vendor, and homeowners association.

13. The computer program product of claim 10, wherein the at least one escrow document comprises one of a grant deed, certificate of ownership, title insurance policy, loan document, loan application, homeowner's association document, zoning disclosure report, home warranty policy, pest inspection, property inspection, natural hazard disclosure, geological report, lead-based paint inspection, settlement or closing statement, promissory note, amendment, title report, loan payoff forms, loan information request, statement of information, trust certification, deed of trust, city report, instructions, seller proceeds information, preliminary change of ownership, preliminary approval, insurance information form, lender amendment forms, buyer ownership form, instructions regarding release of funds, government form, and a quasi-government form.

14. The computer program product of claim 10, wherein the tracking further comprises displaying the online status of the electronically or digitally signed at least one escrow document.

15. The computer program product of claim 10 further comprising providing a language translation for the at least one escrow document.

16. The computer program product of claim 10 further comprising providing data security to the at least one escrow document.

17. The computer program product of claim 10, further comprising providing digital identity authentication for the first or second party.

18. The computer program product of claim 10, wherein the digital instructions comprise voice-based digital instructions.

19. The computer program product of claim 10, wherein the least one escrow document is associated with a transaction number.

20. The computer program product of claim 17, further comprising providing digital identity authentication including at least one of on-line digital signature, electronic signature, biometrics, wireless identity authentication, audio or visual recording, video fingerprint, thumb-print, retinal scan, video signature authentication, voice authentication, digital certificate authentication, and digital signature document execution.

21. The computer program product of claim 10, wherein the closing further comprises at least one of electronically transferring, registering, and recording of electronic or digital documents.

22. A system for processing an escrow, comprising:
a server coupled to a network including a memory and a processor configured to;
via online communications at least one of (1) receive or send at least one escrow document to be signed electronically or digitally related to the escrow process, (2) send digital instructions to a first party involved in the escrow process to electronically or digitally sign at least one escrow document, (3) implement identity authentication on at least one escrow document to be electronically or digitally signed, (4) electronically or digitally sign at least one escrow document, and (5) provide for a variety of levels of security for access to at least one escrow document that is to be electronically or digitally signed;

track online a status of the electronically or digitally signed at least one escrow document;

manage by receiving online the electronically or digitally signed at least one escrow document; and close by at least one of verifying online that the electronically or digitally signed at least one escrow document has been signed, submit the electronically or digitally signed at least one escrow document to a second party involved in the escrow, and receive or send online confirmation of a close of the escrow including that the at least one escrow document has been electronically or digitally signed.

23. The system of claim 22, wherein the network is one of a dial-up, leased, satellite, or wireless network.

24. The system of claim 22, wherein the network comprises at least one of an extranet and Internet.

25. The system of claim 22, wherein the first or second party comprises one of a principal, agent, real estate agent or broker, mortgage agent or broker, notary, service provider, title or abstract company or representative, closing or settlement agent, secondary investor, loan servicer, attorney, banker, lending institution, insurance company, government entity, quasi-governmental entity, vendor, and homeowners association.

26. The system of claim 22, wherein the at least one escrow document comprises one of a grant deed, certificate of ownership, title insurance policy, loan document, loan application, homeowner's association document, zoning disclosure report, home warranty policy, pest inspection, property inspection, natural hazard disclosure, geological report, lead-based paint inspection, settlement or closing statement, promissory note, amendment, title report, loan payoff forms, loan information request, statement of information, trust certification, deed of trust, city report, instructions, seller proceeds information, preliminary change of ownership, preliminary approval, insurance information form, lender amendment forms, buyer ownership form, instructions regarding release of funds, government form, and a quasi-government form.

27. The system of claim 22, wherein the processor is configured to display the online status of the electronically or digitally signed at least one escrow document.

28. The system of claim 22, wherein the processor is configured to provide a language translation for the at least one escrow document.

29. The system of claim 22, wherein the processor is configured to provide data security to the at least one escrow document.

30. The system of claim 22, wherein the processor is configured to provide digital identity authentication for the first or second party.

31. The system of claim 22, wherein the digital instructions comprise voice-based digital instructions.

32. The system of claim 22, wherein the least one escrow document is associated with a transaction number.

33. The system of claim 30, further comprising providing digital identity authentication including at least one of on-line digital signature, electronic signature, biometrics, wireless identity authentication, audio or visual recording, video fingerprint, thumb-print, retinal scan, video signature authentication, voice authentication, digital certificate authentication, and digital signature document execution.

34. The system of claim 22, wherein the closing further comprises at least one of electronically transferring, registering, and recording of electronic or digital documents.

35. A method for conducting an escrow, comprising
at a first computer coupled to an online network, at least one of (1) receiving or sending at least one escrow document to be signed electronically or digitally related to the escrow process, (2) sending digital instructions to a first party involved in the escrow process to electronically or digitally sign at least one escrow document, (3) implementing identity authentication on at least one escrow document to be electronically or digitally signed, (4) electronically or digitally signing at least one escrow document, and (5) providing for a variety of levels of security for access to at least one escrow document that is to be electronically or digitally signed;
tracking online a status of the electronically or digitally signed at least one escrow document;
managing by receiving online the electronically or digitally signed at least one escrow document; and
closing by at least one of verifying online that the electronically or digitally signed at least one escrow document has been signed, submitting the electronically or digitally signed at least one escrow document to a second party involved in the escrow process, and receiving or sending online confirmation of a close of the escrow process including that the at least one escrow document has been electronically or digitally signed.

36. The method of claim 35, wherein the network is one of a dial-up, leased, satellite, and wireless network.

37. The method of claim 35, wherein the network comprises at least one of an extranet and Internet.

38. The method of claim 35, wherein the first or second party comprises one of a principal, agent, real estate agent or broker, mortgage agent or broker, notary, service provider, title or abstract company or representative, closing or settlement agent, secondary investor, loan servicer, attorney, banker, lending institution, insurance company, government entity, quasi-governmental entity, vendor, and homeowners association.

39. The method of claim 35, wherein the at least one escrow document comprises one of a grant deed, certificate of ownership, title insurance policy, loan document, loan application, homeowner's association document, zoning disclosure report, home warranty policy, pest inspection, property inspection, natural hazard disclosure, geological report, lead-based paint inspection, settlement or closing statement, promissory note, amendment, title report, loan payoff forms, loan information request, statement of information, trust certification, deed of trust, city report, instructions, seller proceeds information, preliminary change of ownership, preliminary approval, insurance information form, lender amendment forms, buyer ownership form, instructions regarding release of funds, government form, and a quasi-government form.

40. The method of claim 35, wherein the tracking further comprises displaying the online status of the electronically or digitally signed at least one escrow document.

41. The method of claim 35 further comprising providing a language translation for the at least one escrow document.

42. The method of claim 35 further comprising providing data security to the at least one escrow document.

43. The method of claim 35, further comprising providing digital identity authentication for the first or second party.

44. The method of claim 35, wherein the digital instructions comprise voice-based digital instructions.

45. The method of claim 35, wherein the least one escrow document is associated with a transaction number.

46. The method of claim 43, further comprising providing digital identity authentication including at least one of on-line digital signature, electronic signature, biometrics, wireless identity authentication, audio or visual recording, video fingerprint, thumb-print, retinal scan, video signature authentication, voice authentication, digital certificate authentication, and digital signature document execution.

47. The method of claim 35, wherein the online communications comprise at least one of an extranet and Internet.

48. The method of claim 35, wherein the closing further comprises at least one of electronically transferring, registering, and recording of electronic or digital documents.

* * * * *